No. 776,680. PATENTED DEC. 6, 1904.
C. R. PARKS.
SELF FEEDER FOR THRESHING MACHINES.
APPLICATION FILED MAY 7, 1903.
NO MODEL. 2 SHEETS—SHEET 1.
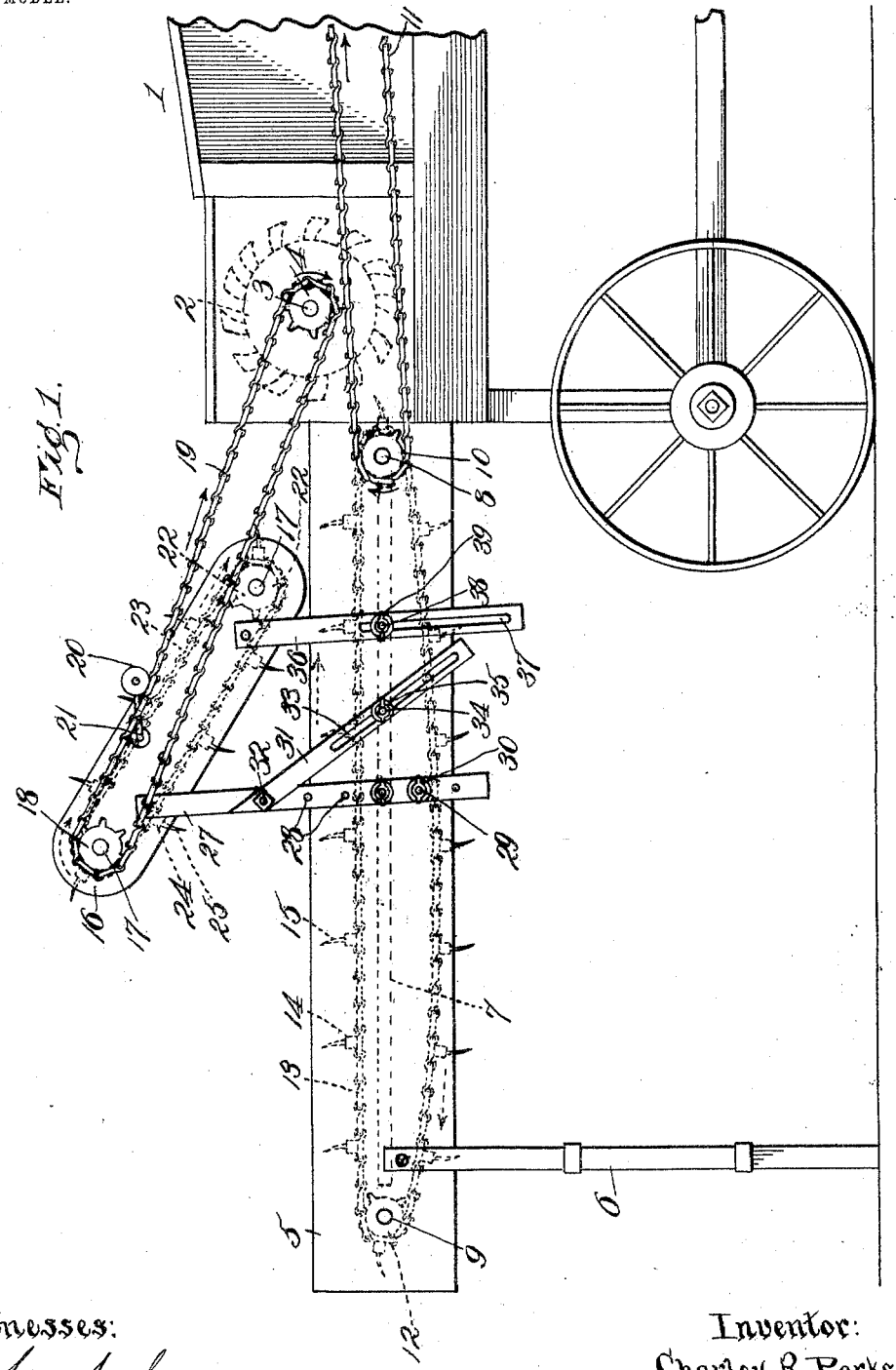
Witnesses:
A. McArthur
H. C. Rodgers
Inventor:
Charley R. Parks
By George H. Thorpe
Atty.

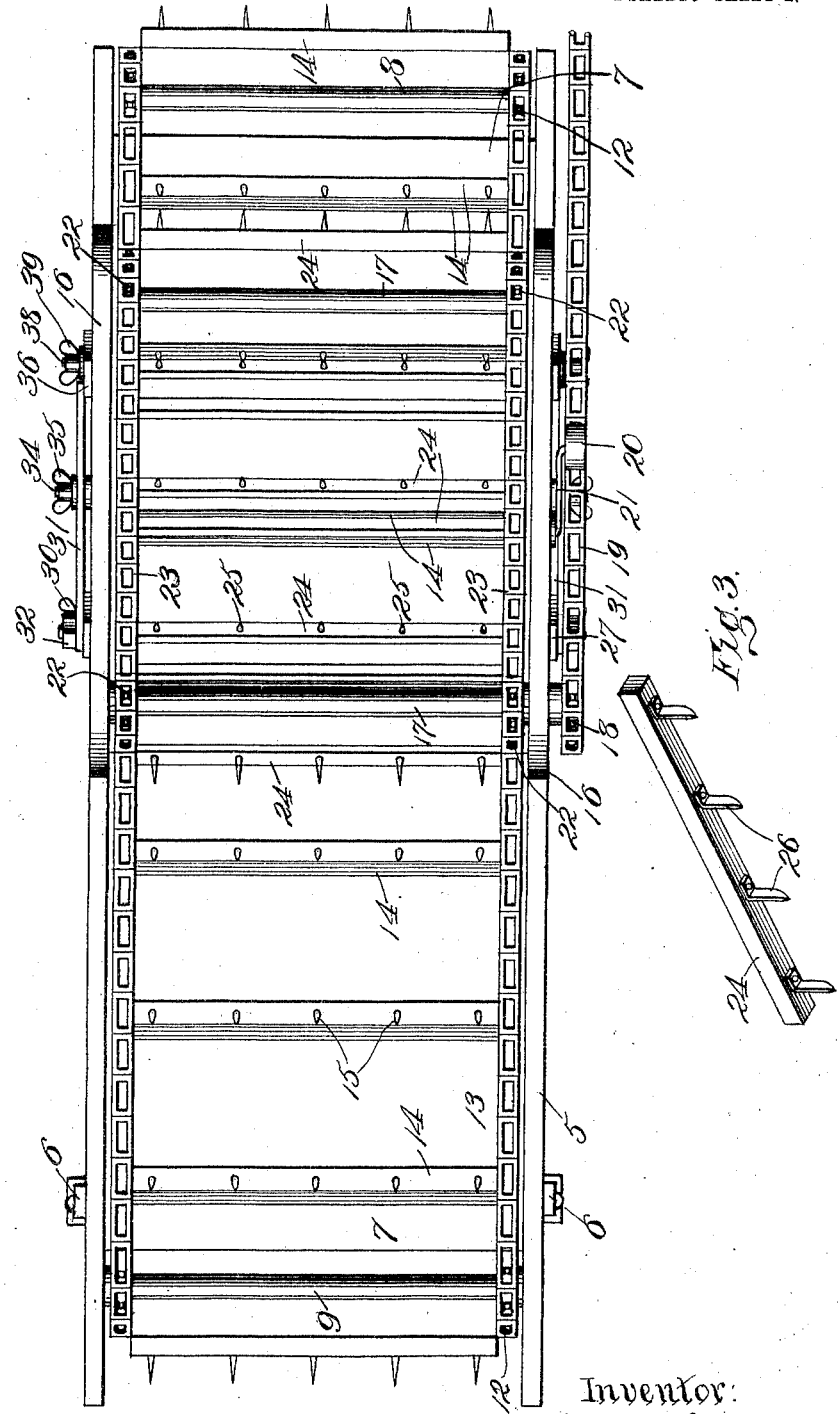

No. 776,680.                                                                                                  Patented December 6, 1904.

UNITED STATES PATENT OFFICE.

CHARLEY R. PARKS, OF RAYMOND, KANSAS.

SELF-FEEDER FOR THRESHING-MACHINES.

SPECIFICATION forming part of Letters Patent No. 776,680, dated December 6, 1904.

Application filed May 7, 1903. Serial No. 155,984. (No model.)

*To all whom it may concern:*

Be it known that I, CHARLEY R. PARKS, a citizen of the United States, residing at Raymond, in the county of Rice and State of Kansas, have invented certain new and useful Improvements in Self-Feeders for Threshing-Machines, of which the following is a specification.

My invention relates to self-feeders for threshing-machines; and my object is to produce a machine of this character which will feed any kind of grain in a uniform volume to the cylinder, so as to avoid danger of the latter becoming choked.

A further object is to provide a machine which will accommodate grain of different kinds and conditions.

A still further object is to produce a machine of simple, strong, durable, and cheap construction.

To these ends, the invention consists in certain novel and peculiar features of construction and combinations of parts, as hereinafter described and claimed, and in order that it may be fully understood reference is to be had to the accompanying drawings, in which—

Figure 1 represents a side elevation of a portion of a threshing-machine equipped with a self-feeder embodying my invention. Fig. 2 is a top plan view of the self-feeder. Fig. 3 is a detail perspective view of one of the cross-bars equipped with band-cutters embodying my invention.

Referring to the drawings in detail, 1 designates a threshing-machine of any suitable or preferred construction and equipped with the usual cylinder 2, having its shaft 3 provided with a small sprocket-wheel 4 at one end. Secured to the threshing-machine in any suitable or preferred manner at one end are the side bars 5 of the self-feeder or carrier-frame, the opposite end of the feeder being mounted pivotally upon legs 6 of the type shown or of any other suitable construction. The side bars of the feeder are connected by means of a plate 7, the opposite ends of the side bars having journaled therein the same carry shafts 8 and 9. The shaft 8 is equipped with a sprocket-wheel 10, driven by chain 11, connected by preference to a driven wheel (not shown) of the threshing-machine.

The shafts 8 and 9 are provided just within the side bars 5 with sprocket-wheels 12, connected by chains 13, the chains being connected in turn by cross-bars 14, having teeth 15, the teeth being of such form and arrangement that they project upwardly and slightly rearwardly with respect to their direction of movement, so that the cylinder shall easily sweep the grain therefrom, and thus prevent it from being carried around and dropped upon the ground at the front of the thresher.

For the purpose of effecting the even distribution of the grain to the cylinder 1 provide a distributer constructed as follows: 16 designates the distributer sides arranged above and in the vertical plane of the feeder side bars 5 and connected at their opposite ends by shafts 17, one of the latter, preferably the front one, having a sprocket-wheel 18 on its outer end connected by chain 19 to the sprocket-wheel 4, so as to be driven by the cylinder-shaft, and said chain is tensioned by means of a heavy roller 20, mounted at the outer end of an arm 21, hinged or pivoted to the contiguous distributer side 16. Mounted on shaft 17, just within the distributer sides, are sprocket-wheels 22, connected by chains 23, said chains being in turn connected by cross-bars 24, having outwardly-projecting fingers 25 or knives 26, as in Fig. 3, it being understood that the fingers are for use on the distributer when loose grain is being fed and that the knives are employed to cut the bands of bundled grain, as in the usual band-cutter. It will also be understood that these fingers or knives 25 26 slope or curve slightly rearwardly with respect to their direction of movement, so that as they sweep over the oppositely-moving conveyer they reduce the grain carried by the latter to a uniform thickness or volume and they will not pick up any of the grain and carry it upwardly and forwardly and over the mass of grain upon the conveyer.

The distributer is mounted pivotally upon the upper ends of a pair of front standards 27, having a longitudinal series of perforations 28, one or more of which are engaged by a bolt or bolts 29, projecting from the feeder sides, clamping-nuts 30 being employed to secure such relation of the parts. Where only one bolt is employed for each standard, it is desirable that said standards be additionally supported, the additional support employed being inclined braces 31, pivoted at their upper ends, as at 32, to the standards 27 and provided with longitudinal slots 33, engaged by bolts 34, projecting from the feeder sides, the bolts being engaged in turn by clamping-nuts 35.

The rear end of the distributer, which is preferably pitched downwardly at about the angle shown in Fig. 1, is mounted pivotally on the upper end of rear standards 36, provided with longitudinal slots 37, engaging bolts 38, projecting from the feeder sides and engaged in turn by clamping-nuts 39. It will be seen by reference to these supporting-standards and the braces therefrom that the operator is enabled to vary the angle or inclination of the distributer or to raise and lower the same with reference to the feeder below, the adjustments necessary in any case being dictated by the experience of the operator with the machine and with the kinds of grain he is using, also by reason of the condition of the grain, as the distributer occupies a different position when operating upon dry than when operating upon wet grain.

In the practical operation of the machine loose grain, pitchforked or otherwise deposited upon the front end of the feeder-carrier, is conveyed rearwardly toward the cylinder and below the distributer in order that the endless conveyer of the latter, traveling in the opposite direction, shall effect an even distribution upon the said feeder-carrier. This insures a constant and uniform feed to the cylinder, and thus avoids all danger of feeding the latter beyond its capacity and stopping or retarding the threshing operation. Where bundled grain is to be threshed, the distributer is equipped with the knives 26 to cut the bands as well as effect the distribution of the grain.

From the above description it will be apparent that I have produced a self-feeder for threshing-machines which embodies the features of advantage enumerated as desirable in the statement of invention and which is obviously susceptible of modification in a number of particulars without departing from the principle or scope or sacrificing any of the advantages of the invention.

Having thus described the invention, what I claim as new, and desire to secure by Letters Patent, is—

The combination with a threshing mechanism, of a self-feeder attached thereto and comprising a carrier-frame, a conveyer mounted therein, a distributer-frame, front and rear standards, the upper ends of each of the standards being pivotally secured to the distributer-frame, the lower ends of the rear standards being adjustably secured to the carrier-frame, the front standards having a longitudinally-extending series of perforations formed therein, means receivable in any one of the series of perforations and engaging the carrier-frame to adjust the standards, braces, the lower ends of the braces being adjustably secured to the carrier-frame to permit a longitudinal movement of the braces, means carried by the upper ends of the braces and received in any one of the series of perforations in the front standards to adjustably connect the braces and perforated standards to permit a longitudinal adjustment of the braces, a conveyer located in the distributer-frame, a rotating cylinder, means directly connecting the rotating cylinder and the distributer-conveyer and means independent of the cylinder for connecting the carrier-conveyer with any suitable source of power to actuate the carrier-conveyer at a different speed than that at which the distributer-conveyer is traveling.

In testimony whereof I affix my signature in the presence of two witnesses.

CHARLEY R. PARKS.

Witnesses:
G. W. KELLY,
A. H. BRESSLER.